May 1, 1951 — A. L. HOFFMAN — 2,551,268
COMBINED BAND SAW AND WORK SUPPORT
Filed June 15, 1948 — 4 Sheets-Sheet 1

Inventor:
Alfred L. Hoffman
BY Harry B. Cook,
Attorney.

May 1, 1951 — A. L. HOFFMAN — 2,551,268
COMBINED BAND SAW AND WORK SUPPORT
Filed June 15, 1948 — 4 Sheets-Sheet 2
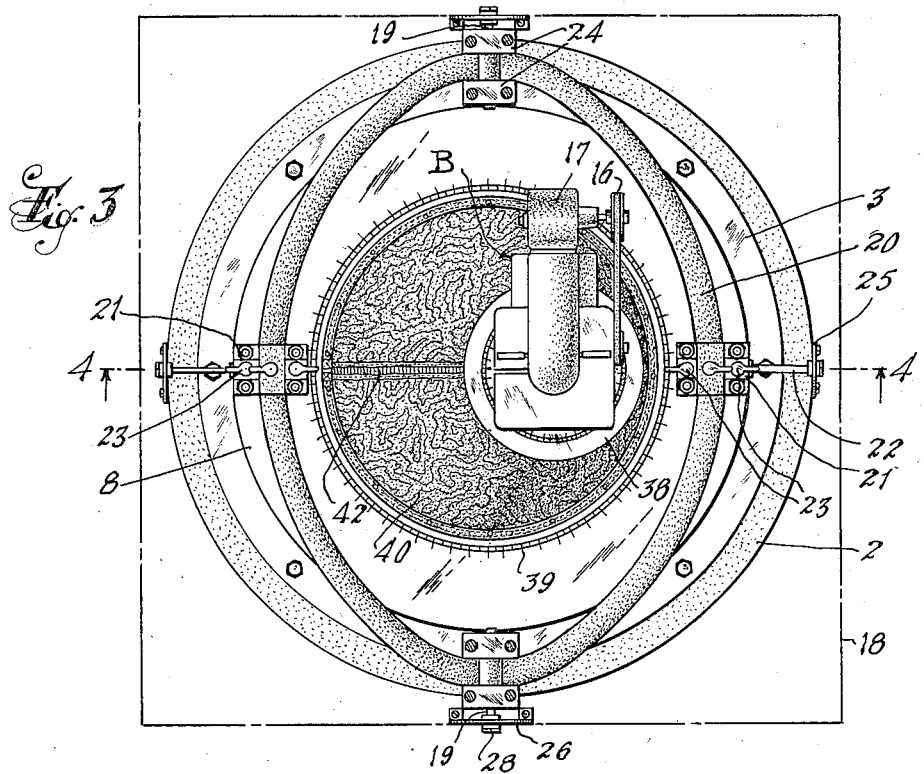
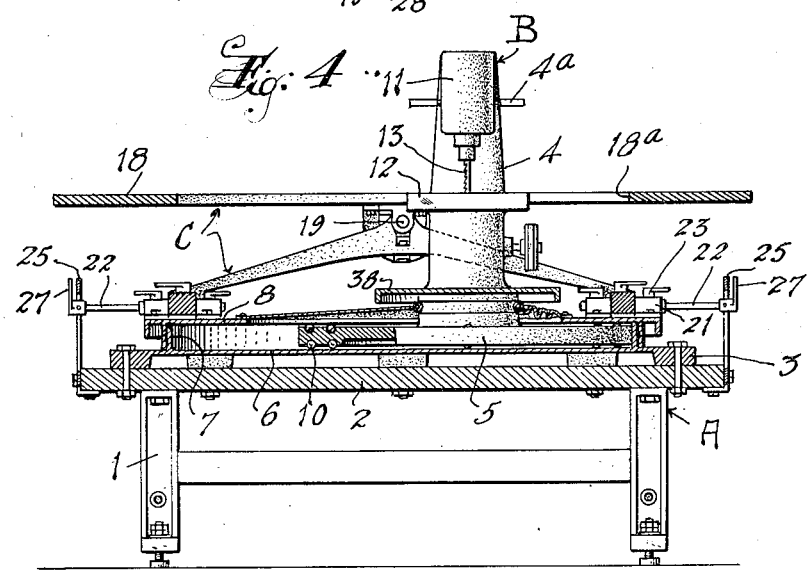
Inventor:
Alfred L. Hoffman
BY
Attorney.

May 1, 1951  A. L. HOFFMAN  2,551,268
COMBINED BAND SAW AND WORK SUPPORT
Filed June 15, 1948  4 Sheets-Sheet 3
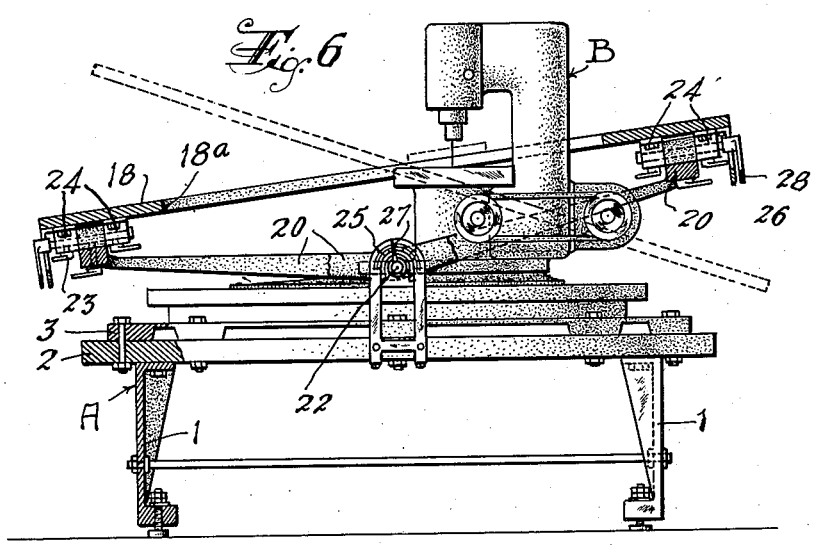
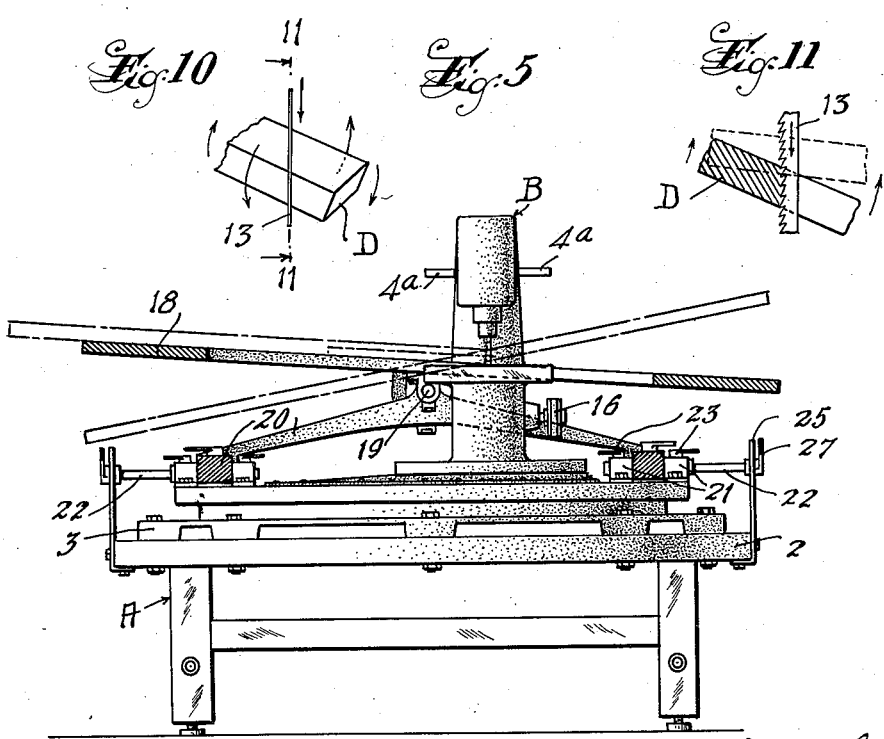
Inventor:
Alfred L. Hoffman
BY
Attorney

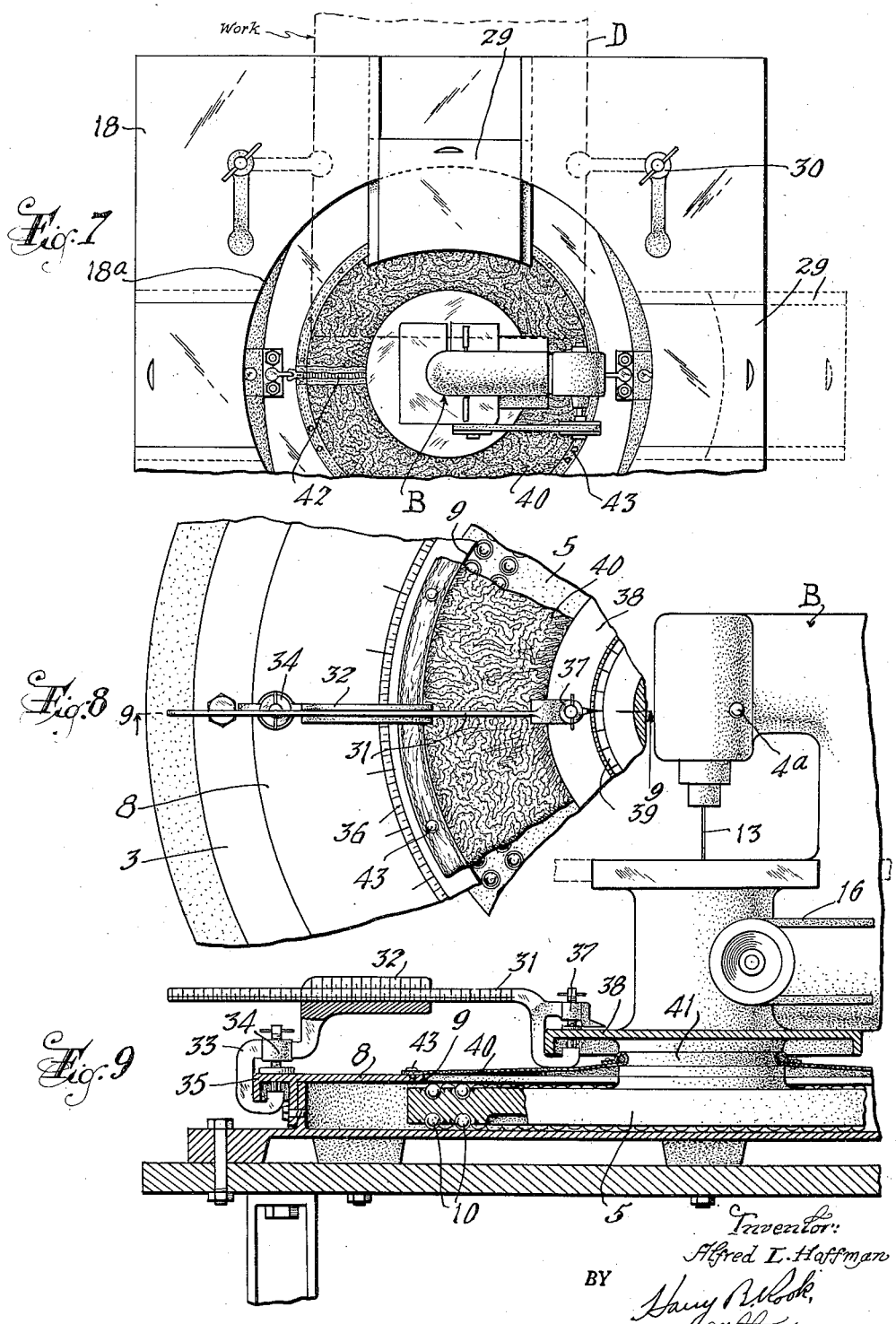

Patented May 1, 1951

2,551,268

UNITED STATES PATENT OFFICE 2,551,268

COMBINED BAND SAW AND WORK SUPPORT

Alfred L. Hoffman, West Orange, N. J.

Application June 15, 1948, Serial No. 33,005

4 Claims. (Cl. 143—17)

This invention relates in general to a combination of a band saw and a work support, and more particularly to such a combination wherein the saw is moved against the work instead of the work being fed against the saw.

One object of the invention is to provide a combined band saw and work support which shall embody novel and improved features of construction such that the saw can be moved by the operator in any desired direction into engagement with the work, and whereby the combination shall possess the advantages of a band saw, a bench saw, and a jig saw.

Another object is to provide such a machine wherein the saw shall be rotatable through circular paths of various diameters and shall also be capable of movement in straight lines or in composite curved lines at the will of the operator.

A further object is to provide a combination of the character described which shall include a novel and improved work table and means for mounting it whereby the work may be tilted at various angles relative to the saw, for example to provide mitre cuts in planes oblique to the general plane of the work.

Other objects, advantages, and results of the invention will be brought out by the following description in conjunction with the accompanying drawings in which Figure 1 is a side elevational view of a combined band saw and work support embodying my invention.

Figure 3 is a top plan view of the machine with the work supporting table removed.

Figure 4 is a central vertical sectional view approximately on the plane of the line 4—4 of Figure 3 with the work table included.

Figure 5 is a view similar to Figure 4 showing the work table tilted relatively to the band saw.

Figure 6 is a partial side elevational and partial sectional view taken from a position at right angles to that shown in Figure 5.

Figure 7 is a fragmentary top plan view of the machine with the work table included and with the saw shown in a different position from that illustrated in Figure 3.

Figure 8 is an enlarged fragmentary plan view showing a mitre gauge.

Figure 9 is a vertical sectional view approximately on the plane of the line 9—9 of Figure 8.

Figure 10 (Sheet 3) is a fragmentary schematic perspective view showing the work tilted by the work table relatively to the saw blades, and Figure 11 is a vertical sectional view approximately on the plane of the line 11—11 of Figure 10.

Figure 2:
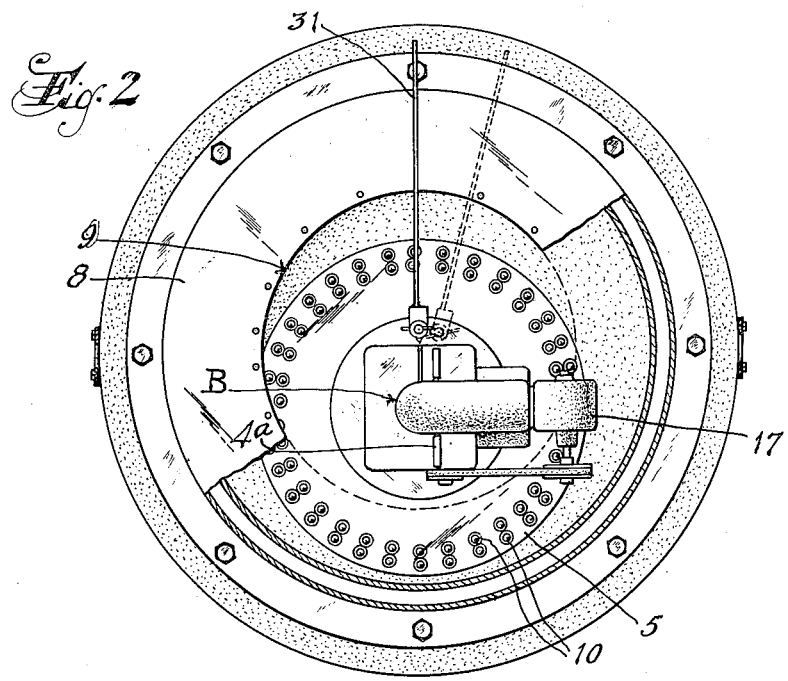
Figure 2 is a horizontal sectional view approximately on the line 2—2 of Figure 1 with portions broken away for clearness in illustration.

Specifically describing a machine embodying the invention, the combined band saw and work support is shown as comprising a main frame or bench A having legs 1 and a top 2 on which is secured the base 3 of the machine which is shown as approximately circular in plan.

Mounted on the base 3 is a band saw B that comprises a pedestal or standard 4 that is carried by a base 5 (Figs. 4 and 9) which is horizontally movable in any direction in a horizontal plane on the bed 3. As shown, the bed has a bottom plate 6, a circular upstanding wall 7 on said bottom plate and an annular top wall 8 that projects inwardly from the side wall 7 in spaced relation to the bottom plate 6. The base 5 of the band saw is of a diameter slightly greater than the diameter of the opening 9 formed by the inner perimeter of the top plate 8, and said base 5 is guided by and between said base and top plates. Desirably ball bearings 10 are provided to facilitate movement of the band saw. The band saw also includes a goose neck and saw guide 11 that projects from the pedestal, and another saw guide 12 that projects upwardly from the base in spaced relation to the goose neck, and a band saw 13 of known construction is arranged to traverse a space between the goose neck 11 and the guide arm 12. As shown, the band saw passes over pulleys 14 in the pedestal, goose neck, and base and is driven by a belt and pulley connection 16 from an electric motor 17 mounted on the side of the pedestal.

The saw guide arm 12 may be used for supporting small pieces of work in simple sawing operations, but is unessential in the support of large pieces of work.

A work supporting table C is mounted on the top of the bed 3 so as to tilt about two horizontal axes that are perpendicular to each other. As shown, the table comprises a top or work supporting plate 18 which has a circular central opening 18a within which the band saw B is movable, and the plate 18 is mounted by stub shafts 19 in two horizontally aligned bearings disposed at diametrically opposite points on a mounting ring 20 which is in turn pivotally mounted in bearings 21 on the top plate 8 of the bed by shafts 22 whose axes are in horizontal alignment with each other and perpendicular to the axes of the shafts 19. With this construction it will be seen that the work suporting plate 18 may be tilted both about the axes of the shaft 22 as shown by solid and broken lines in Figure 6 and may also be tilted about the axes of the shafts 19 as shown by solid and broken lines in Figure 5. Any suitable means may be used for holding the plate 18 in adjusted positions, but I have shown clamping screws 23 in the bearings 21 and 24 of the respective shafts for clamping the shafts against rotation in the bearings.

Figure 1:
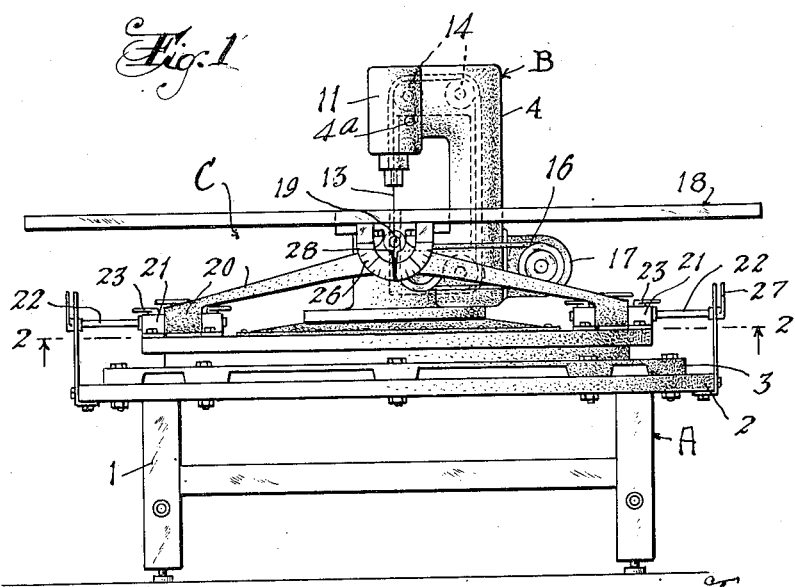

Preferably graduated quadrants 25 (Fig. 6) and 26 (Fig. 1) are mounted respectively on the bench A and on the under side of the plate 18, to cooperate with the respective pointers 27 and 28 on the corresponding shafts 22 and 19, for indicating the angles of adjustment of the plate.

Also, preferably, the table has slidable auxiliary work suports 29 (Fig. 7) that at will may be projected into the opening 18a in the work supporting plate 18, to facilitate in the handling of special pieces of work. Suitable work clamps 30 are mounted on the work supporting plate 18 at various positions for firmly holding the work designated D) against movement on the top.

In operation of the machine, the work will be clamped on the work support plate 18 in proper relation to the saw blade 13, and if necessary the table will be tilted to the required angle and clamped in the adjusted positions by the clamping screws 23. Then the motor of the band saw B will be started as by closing a switch, and the operator will grip one or both of the handles 4a (Figs. 4 and 5) on the saw pedestal and push or pull the saw into engagement with the work and in the direction required for making the desired cut. It will be seen that the saw can be bodily rotated on the bed 3 throughout an arc of 360° and may also be rotated about the axis of the base in alignment with which the saw 13 is preferably located. Also the saw may be moved in straight lines or in composite straight and curved lines. By tilting the table at the desired angle, the cuts may be made obliquely to the plane of the work as shown in Figures 10 and 11.

It may be desirable to have a positive mitre guide, and accordingly I propose to adjustably mount a guide arm 31 on the pedestal of the saw to cooperate with a guide channel 32 adjustably mounted on the bed 3. As shown in Figures 8 and 9, the guide channel 32 nicely slidably receives the guide arm 31 and has a mounting arm 33 provided with a screw clamp 34 for connecting the guide channel to a flange 35 on the top plate 8 of the bed. Suitable graduation marks 36 may be provided on said top plate for setting the guide channel in the desired position. One end of the guide arm 31 also has a clamp 37 similar to the clamp 34 for connecting the arm to a flange 38 on the pedestal, and graduation marks 39 may be provided on said flange for setting the guide arm.

In use, the arm and channel will be set at the desired angle and then the saw will be pulled by the operator so as to cause the guide arm 31 to slide in the channel 32, and this will result in the positive guiding of the saw blade in the desired direction.

Preferably means is provided to prevent the accumulation of saw dust around the base 5 of the saw, and this may be accomplished by utilizing a split-circular boot or cover 40 of suitable flexible or elastic material which encircles the lower portion of the pedestal, preferably in a groove 41 as shown in Figure 9, and has its ends connected by a slide fastener 42 (Fig. 7) of any suitable construction to snugly hold the cover in contact with the pedestal. The outer edge of the cover may be separably attached to the top plate 8 of the bottom in any suitable manner, for example by head and socket fasteners 43.

While I have shown and described the invention as embodied in certain details of construction, it should be understood that this is primarily for the purpose of illustrating the purpose of the invention and that many modifications and changes may be made in the construction of the machine within the spirit and scope of the invention.

Having thus described my invention, what I claim is:

1. A band saw comprising a horizontal bed, a frame having thereon a saw band and means for driving it, said frame also having a circular base and said bed having an annular groove in which the marginal portions of said base are slidable thereby providing for movement of said frame in any of a plurality of horizontal directions.

2. A band saw comprising a horizontal bed having a central opening, an annular undercut channel surrounding and facing into said opening, a frame having a base slidably fitted into said groove for horizontal movement relatively to said bed, said frame also including a pedestal extending upwardly from said base through said annular opening and having a saw band and means for driving it mounted thereon, whereby said frame is movable in any of a plurality of horizontal directions.

3. A band saw as defined in claim 2 with the addition of a work supporting plate juxtaposed to said frame, and means mounting said plate for adjustment into oblique planes.

4. A band saw as defined in claim 2 with a flexible cover connected between said frame and said bed and closing said central opening to prevent accumulation of saw dust in said channel.

ALFRED L. HOFFMAN.

REFERENCES CITED

The following references are of record in the file of this patent:

UNITED STATES PATENTS

| Number | Name | Date |
| --- | --- | --- |
| 547,260 | Hinternesch | Oct. 1, 1895 |
| 822,056 | Knox | May 29, 1906 |
| 905,265 | Wise | Dec. 1, 1908 |
| 1,089,192 | Erquhart et al. | Mar. 3, 1914 |
| 2,090,195 | Grob | Aug. 17, 1937 |
| 2,415,877 | Hajek | Feb. 18, 1947 |
| 2,490,281 | Rose | Dec. 6, 1949 |